Patented Feb. 11, 1941

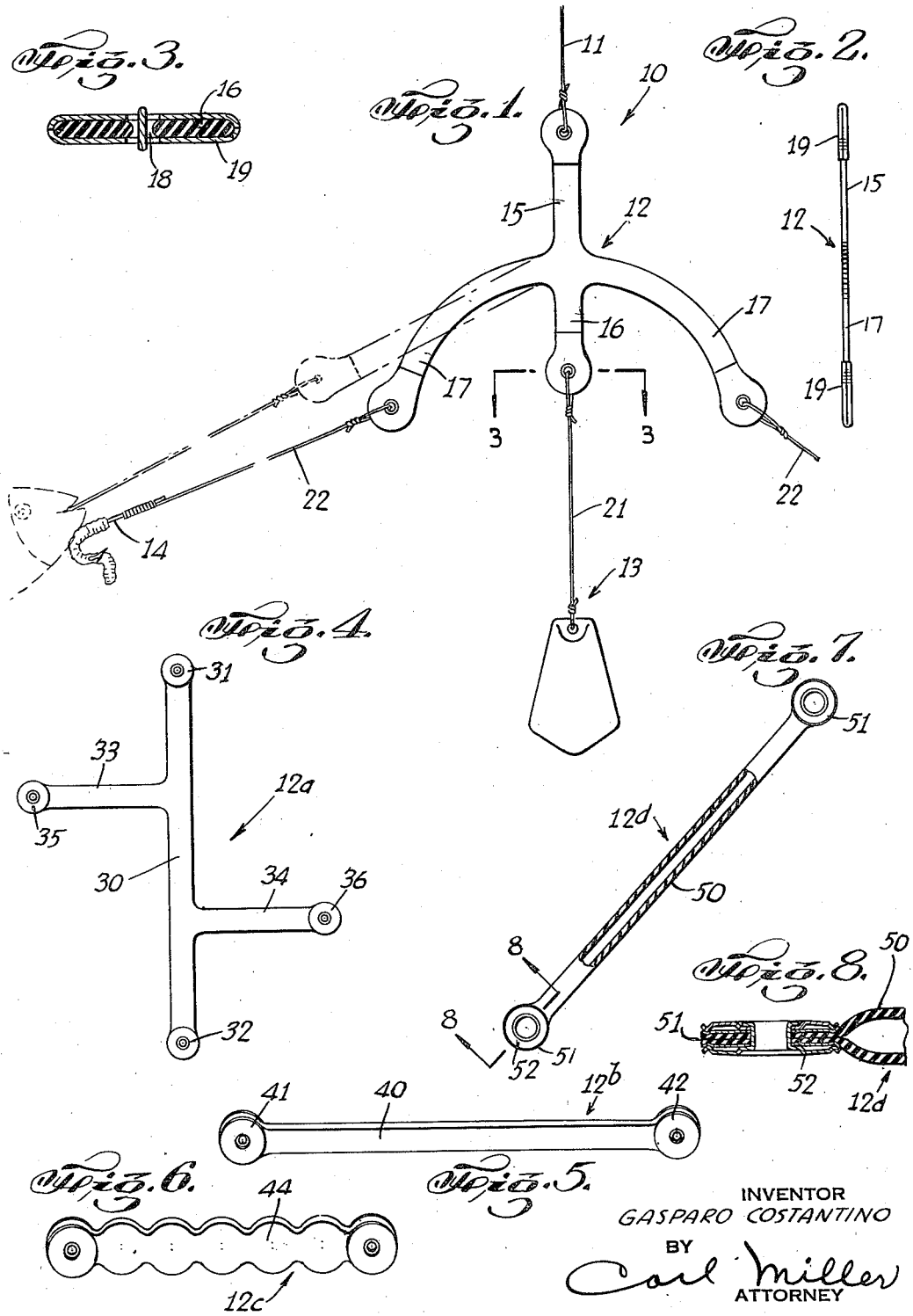

2,231,616

UNITED STATES PATENT OFFICE 2,231,616

FISHING LINE

Gasparo Costantino, Astoria, Long Island, N. Y., assignor of fifty per cent to Charles Curtis, New York, N. Y.

Application September 1, 1938, Serial No. 227,994

8 Claims. (Cl. 43—28)

This invention relates to fishing lines, and is particularly directed to an elastic fishing rig made of rubber, adapted to carry fishing hooks and interposed between the sinker, plug or fly, and the rest of the line leading to the rod and reel.

An object of this invention is to provide a fishing rig of the character described, which shall be elastic and stretchable, preferably being made of rubber, so that when a fish bites at the bait on the hooks which are attached to the rig, the automatic stretch and contraction of the elastic rig will aid in hooking the fish. The rig furthermore being made of rubber will aid in working the sinker loose should the sinker be caught either in sand or in rocks. Furthermore, with the use of a rubber, stretchable, elastic rig, should a fish caught on a hook attached to said rig, hide behind a rock or other obstruction, the flexing of the rubber rig, when the line is pulled and released, will tend to work the fish loose from such rock or obstruction. With the improved construction, furthermore, wherein the rig is interposed between the sinker and the line and carries the hooks, should the sinker be caught in a rock at the time when a fish is caught on one of the hooks, even though the sinker may remain lost, the fish will remain caught at the end of the hook and can be pulled in.

Yet another object of this invention is to provide a rig for a fishing line, made of rubber and having a vertical portion and arms extending outwardly to opposite sides of the vertical portion, one end of the vertical portion having means for connection to the line, and the other end of the vertical portion having means for connection to the sinker, and the arms having means for attaching hooks, the arms being made of rubber serving as spreaders to keep the hooks apart, thus, preventing snarling or tangling of the line, sinker and hooks; such construction, furthermore, permitting the hooks to float at desired levels above the bottom while the sinker is on the bottom, whereby fish may be caught at various depths, depending upon the positions of the arms which carry the hooks on the vertical portion which carries the sinker and the line.

A further object of this invention is to provide in a fishing line of the character described, a rig made of elastic rubber interposed between the cord and the sinker, whereby the rig acts as a buffer and prevents breaking of the line when a fish pulls on the line.

Still another object of this invention is to provide a durable fishing line of the character described for casting or bottom fishing, which shall be relatively inexpensive to manufacture, and yet practical and efficient to a high degree in use.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claims.

In the accompanying drawing, in which is shown one of the various possible illustrative embodiments of this invention, Figure 1 is a front elevational view of the bottom end of a fishing line embodying the invention, showing a portion of the cord, an improved rig attached thereto, and a sinker and hooks on the rig;

Figure 2 is a side elevational view of the improved rig;

Figure 3 is an enlarged cross-sectional view taken on line 3—3 of Figure 1;

Figure 4 is a front elevational view of a fishing rig embodying the invention, and illustrating a modified construction;

Figure 5 is a perspective view of a fishing rig used for casting, embodying the invention;

Figure 6 is a view similar to Figure 5, but illustrating another form of the invention;

Figure 7 is a front, elevational view of a casting rig embodying the invention and illustrating a still further modified form of the invention; and Figure 8 is an enlarged cross-sectional view taken on line 8—8 of Figure 7.

Referring now in detail to the drawing, 10 designates a fishing line embodying the invention, and comprising a cord or line 11, an improved rig 12 connected to the line 11, a sinker 13 connected to the rig 12, and fishing hooks 14 connected to the rig.

The rig 12 may be made of elastic stretchable rubber. The same is made of a flat piece of rubber, and has an upwardly extending arm 15, a downwardly extending arm 16 and downwardly and outwardly curved arms 17. The end of each arm is formed with an opening 18 and may be reinforced by a covering 19 of cloth, leather or any other suitable reinforcing material.

The cord or line 11 is looped through the opening at the upper end of the arm 15 and tied, as shown in the drawing. The sinker 13 is on a piece of cord 21, looped through the opening at the bottom end of the arm 16, and tied as indicated in the drawing. The hooks 14 are on cords 22, passing through the openings at the outer ends of the arms 17 and tied thereto.

It will now be understood that after a fish is caught on a hook 14 and pulls, the pull will be taken up by the arm 17, as shown in dot, dash lines in Figure 1 of the drawing. If the sinker is caught in rocks, and the line is pulled, the arms 15 and 16 will be stretched and absorb the shock, so as to save the line 11 from breaking. The contraction of the arms 17, furthermore, serves to aid in hooking the fish. Any pull on the cords 21 or 22 will be taken up by the stretch of the rig 12, which serves to save the line from tearing. The rubber arms 17 serve to spread the hooks 14, and hence prevents snarling or tangling of the line.

In Figure 4 there is shown a fishing rig 12a, illustrating a modified construction. The rig 12a comprises a central vertical portion 30, having apertured ears 31 and 32 at the supper and lower ends thereof. The ear 31 serves for connection to the line 11, and the ear 32 serves for connection to the sinker 13. Extending outwardly from the vertical portion 30, at different heights, are arms 33 and 34, having apertured ears 35 and 36 at the outer ends thereof, to receive fishing hooks. The member 12a may be made of a flat piece of rubber.

When the sinker is on the sea bottom, the arms 33 and 34 may be at various heights, so as to permit catching of fish at various depths. The arms 33 and 34 serve to separate the hooks, whereas, the central member 30 serves to separate the sinker from the line.

In Figure 5 there is shown a fishing rig 12b which may be effectively used when casting. Member 12b is made from an elongated flat piece of rubber 40 and has apertured ears 41 and 42 at the ends thereof to which the line and the fly are connected. The straight member 12b helps in casting by extending the cast to a greater length. Furthermore, the elasticity of member 12b serves as a spring when the cast is made.

In Figure 6 there is shown a fishing rig 12c, similar to the rig 12b, except that the portion 44 thereof, between the apertured ends thereof, is scalloped instead of straight. The portion 44 may also be corrugated if desired.

In Figures 7 and 8 there is shown a fishing rig 12d made of tubular piece of rubber 50, having flat apertured ears 51 at the ends thereof, held in flattened condition by eyelets 52. The line and the fly may be attached to the eyelets 52 at the ends of member 12d.

The fishing rig 12, shown in Figure 1, may also be formed with a central eyelet, and tubular or flat arms of rubber extending from the central eyelet having eyelets at the ends of the arms. Sinkers, hooks and line may be attached to the eyelets.

It will thus be seen that there is provided a device in which the several objects of this invention are achieved, and which is well adapted to meet the conditions of practical use.

As various possible embodiments might be made of the above invention, and as various changes might be made in the embodiment above set forth, it is to be understood that all matter herein set forth or shown in the accompanying drawing is to be interpreted as illustrative and not in a limiting sense.

Having thus described my invention I claim as new and desire to secure by Letters Patent:

1. A fishing rig comprising a single member made of rubber and having a central vertical portion with apertures at the upper and lower ends of said vertical portion, and integral arms extending outwardly from said vertical portion in opposite directions, the outer ends of said arms being formed with openings.

2. A fishing rig comprising a member made of rubber and having a central vertical portion with apertures at the upper and lower ends of said vertical portion, and arms extending outwardly from said vertical portion in opposite directions, the outer ends of said arms being formed with openings, said arms being at different heights relative to said central vertical portion.

3. A fishing rig comprising a flat, elongated elastic piece of rubber, the outer ends of said piece of rubber being reinforced with reinforcing sheet material, and apertured, whereby a fishing line may be passed through the aperture at one end, and a sinker tied to the other apertured end.

4. A fishing rig comprising a one piece flat, elongated elastic piece of rubber, the outer ends of said piece of rubber being reinforced with reinforcing sheet material, and apertured, whereby a fishing line may be passed through the aperture at one end, a sinker tied to the other apertured end, an integral rubber arm on said elongated piece of rubber, and hook attached to the end of said arm.

5. Fishing apparatus comprising in combination a fishing line, a fishing rig made of a single piece of rubber, and having at least three integral arms, one arm being attached to the line, a sinker attached to another arm of the fishing rig, and a hook attached to the third arm of said fishing rig.

6. A fishing rig comprising a single piece of elastic rubber having flat apertured end portions, and an eyelet fixed to each apertured end of the rig, reinforcing the same, one eyelet being adapted for the attachament of a sinker, another eyelet being adapted for the attachment of a hook or fly, and another eyelet being adapted for the attachment of a fishing line.

7. A fishing rig comprising an elongated elastic tubular member made of rubber, each end of said tubular member being flattened to bring opposite portions into contact, and an eyelet fixed to the contacting portions at each end of said member.

8. A fishing rig made of elastic rubber and having at least three arms, means on one arm adapted for the attachment of a sinker, means on another arm adapted for the attachment of a hook or fly, and means on still another arm adapted for the attachment of a fishing line.

GASPARO COSTANTINO.